United States Patent
Rolland

(10) Patent No.: US 6,564,698 B2
(45) Date of Patent: May 20, 2003

(54) VALVE ASSEMBLY

(75) Inventor: Manley Douglas Rolland, Willmar, MN (US)

(73) Assignee: Relco Unisystems Corporation, Willmar, MN (US)

( * ) Notice: Subject to any disclaimer, the term of this patent is extended or adjusted under 35 U.S.C. 154(b) by 0 days.

(21) Appl. No.: 09/981,656

(22) Filed: Oct. 16, 2001

(65) Prior Publication Data
US 2003/0070253 A1 Apr. 17, 2003

(51) Int. Cl.[7] ............................................. A01J 11/00
(52) U.S. Cl. ........................... 99/452; 99/456; 99/483; 137/240
(58) Field of Search ................... 99/456, 452, 460, 99/457, 483, 462; 137/240

(56) References Cited

U.S. PATENT DOCUMENTS

| | | | |
|---|---|---|---|
| 2,918,371 A | * 12/1959 | Jaffe et al. ................... | 99/456 |
| 4,096,586 A | * 6/1978 | Badertscher et al. ...... | 99/452 X |
| 5,591,469 A | * 1/1997 | Zettier ....................... | 99/452 X |
| 5,955,128 A | 9/1999 | Bayevsky et al. | |
| 6,161,558 A | 12/2000 | Franks et al. ................. | 134/57 |

OTHER PUBLICATIONS

G & H Products Corp., Instruction Manual, SRC Sanitary Remote–Controlled Valve, 36 pages, (date unknown).
AlFa Laval, Single Seat Valves, 8 pages, (2001) date unknown.
AlFa Laval, Mixproof Valves, 8 pages, (2001) date unknown.

* cited by examiner

Primary Examiner—Reginald L. Alexander
(74) Attorney, Agent, or Firm—Merchant & Gould P.C.

(57) ABSTRACT

A failsafe valve assembly for use in clean-in-place systems that arranges multiple product blocking valves with one bleed valve. The failsafe valve assembly having a junction providing fluid communication between the primary isolation valve, the one bleed valve and the multiple product valves. The failsafe valve assembly further providing continuous flow cleaning capabilities.

6 Claims, 7 Drawing Sheets

VALVE ASSEMBLY

TECHNICAL FIELD

The present disclosure relates generally to cleaning equipment, and more particularly, to a clean-in-place configuration for cleaning batch processing equipment.

BACKGROUND

Batch processing systems are used in many industries, including for example, dairies, breweries, and pharmaceutical plants. System equipment of batch processing facilities process product in batches or lots and require cleaning between each lot of product processed through the system. These systems typically include equipment such as tanks, pumps, valves, and variously sized piping. Effective batch cleaning processes not only provide better quality products, but also are often required by governmental regulations.

Early methods of cleaning batch processing equipment involved manually scrubbing large batch tanks, valves, and piping. This process requires disassembly of various components and is quite cumbersome and costly. Many batch processing plants now use a clean-in-place (CIP) procedure, which allows partially automatic cleaning while the equipment of the batch processing system remains physically assembled. The CIP procedures rely on temperature, pressure, and chemical concentration of a cleaning fluid, which is re-circulated through the batch processing system, to effectively clean and/or sanitize the batch processing equipment. However, current systems that use a CIP procedure still have some portions that require manual cleaning, which is labor intensive, expensive, and time consuming.

Furthermore, during a CIP procedure, it is important that product is separated from the cleaning fluid to avoid contamination of the product. In the past, the United States Food and Drug Administration (FDA) required manual disconnect between the equipment to be cleaned and the product lines for assurance of separation between product lines and chemical-based cleaning fluids. Various industries and the FDA have worked together to set standards for failsafe, automated separation or isolation. These standards have evolved into the current technology, which utilizes automatic air-operated valves in combination with regulatory standards that ensure product lines are protected from chemical-based cleaning fluid contamination.

To enhance the failsafe operation, automatic air-operated valves are required to have spring-to-failsafe configurations. Furthermore, any blocking valve that is between a header or line that contains a cleaning fluid and a line that contains a product is required to have a mating bleed valve. The bleed valve provides a fluid path for the cleaning fluid to a drain or atmosphere (e.g., to the ground) in case the blocking valve fails. The bleed valve thus protects against contamination of the product. The problem with this requirement is that having one bleed valve for each blocking valve is expensive and causes unnecessarily complicated and bulky valve systems.

SUMMARY

In general terms, the present invention is directed to a valve assembly for a batch processing system that includes a single bleed valve for a plurality of blocking valves.

One aspect of the present invention is a valve assembly for cleaning vessels within a food processing system. The valve assembly comprises two or more product blocking valves. Each product blocking valve has a first port arranged for fluid communication with a vessel and a second port arranged for fluid communication with a product line. One bleed valve has an input port and a drain port. The drain port is in simultaneous fluid communication with the first port of each of the product blocking valves.

Another aspect of this invention relates to a valve arrangement for use in batch processing operations. The valve arrangement comprises a first valve assembly for directing fluid communication of a first media and a second valve assembly for directing fluid communication of at least a second and third media. The second valve assembly includes a primary isolation valve; a plurality of media valves, including at least a first media valve and a second media valve; and a bleed valve. The second valve assembly is arranged to direct fluid communication from the first valve assembly to the bleed valve in the event of failure of the primary isolation valve of the second valve assembly.

Yet another aspect of the present invention relates to a valve assembly for use in a food processing system. The valve assembly comprises a first subassembly for directing fluid communication of cleaning fluid and a second subassembly for directing fluid communication of food products. The second subassembly includes a plurality of food product valves, including at least a first food product valve and a second food product valve, and a blocking valve in fluid communication with the food product valves. The blocking valve operates to direct fluid communications from the food product valves to a food reservoir. The blocking valve also operates to isolate the food product valves from the first subassembly during clean-in-place operations. The second subassembly further includes a bleed valve in fluid communication with the blocking valve. The bleed valve operates to provide a passageway to safely discharge cleaning fluid if the blocking valve fails to isolate the first and second product valves from the first subassembly during clean-in-place operation of the food processing system.

Still another aspect of the present invention relates to a cheese processing system. The cheese processing system comprises a vat having an upper portion and a lower portion. A vat port is located in the lower portion of the vat for providing bottom filling of the vat. The cheese processing system further comprises an output line for transport of a cleaning fluid, a first food product line for transport of a fluid milk product, and a second food product line for transport of a mixture of fluid milk product and cheese curds.

The cheese processing system also includes a valve assembly. The valve assembly provides fluid communication between: the vat and the first output line; the first food product line and the vat; and the vat and the second food product line. The valve assembly includes a clean-in-place valve arrangement and a product isolation valve arrangement. The clean-in-place valve arrangement has a first blocking valve and a clean-in-place bleed valve. The first blocking valve is in fluid communication with the vat port and the clean-in-place bleed valve. The clean-in-place bleed valve is in fluid communication with the first output line and a bleed line. The product isolation valve arrangement has a second blocking valve in fluid communication with the vat port. The second blocking valve is sized to accommodate transportation of the mixture of fluid milk product and cheese curds. The product isolation valve arrangement also has a third blocking valve in fluid communication with the second blocking valve and the first food product line and a fourth blocking valve in fluid communication with the second blocking valve and the second food product line. The fourth blocking valve is sized to accommodate transportation of the mixture of fluid milk product and cheese curds. The product isolation valve arrangement further includes a product isolation bleed valve in fluid communication with the second blocking valve and a drain. The product isolation valve arrangement selectively operates to isolate the first and second food product lines during vat clean-in-place operations.

Yet another aspect of present invention relates to the method of cleaning a system. The system includes a vat, used for processing food product, having a vat port located at the bottom of the vat. The system further includes a valve arrangement in fluid communication with the vat; the valve arrangement having a first blocking valve in fluid communication with the vat port and a first bleed valve in fluid communication the first blocking valve and a cleaning fluid output line. The valve arrangement also has a second blocking valve in fluid communication with the vat port. The second blocking valve includes a common junction. A third blocking valve is in fluid communication with the common junction and a first product line. A fourth blocking valve is in fluid communication with the common junction and a second product line. A second bleed valve is located in fluid communication with the common junction of the second blocking valve and a drain. The method of cleaning relates to selectively actuating or switching the valve arrangement to a clean-in-place configuration for cleaning of the vat.

The clean-in-place configuration actuation comprises: opening the first blocking valve and the first bleed valve to provide fluid communication between the vat and a cleaning fluid output line; closing the second blocking valve so that fluid communication is blocked from entering the common junction; closing the third and fourth blocking valves to provide failsafe operation and prevent fluid communication to product lines if the second blocking valve develops a leak; and opening the second bleed valve so that in the event of the second blocking valve developing a leak, fluid communication is effected through the second bleed valve to a drain. During the clean-in-place process, food product remains within the product lines.

Further, the present invention relates to another aspect of a method of cleaning food product equipment. In this aspect, a product valve arrangement includes a first product valve, a second product valve, a product isolation valve, and a bleed valve. Each valve has a valve surface that contacts food product during processing operations. The method of cleaning comprises flushing a cleaning fluid through the food product equipment in a continuous flow cycle for a period of time and exposing the each of the valve surfaces simultaneously to the cleaning fluid during the flushing period without interruption of the continuous flow cycle.

It is to be understood that both the foregoing general description of various aspects of the invention and the following detailed description are exemplary and explanatory only and are not restrictive.

DETAILED DESCRIPTION

Figure 1:
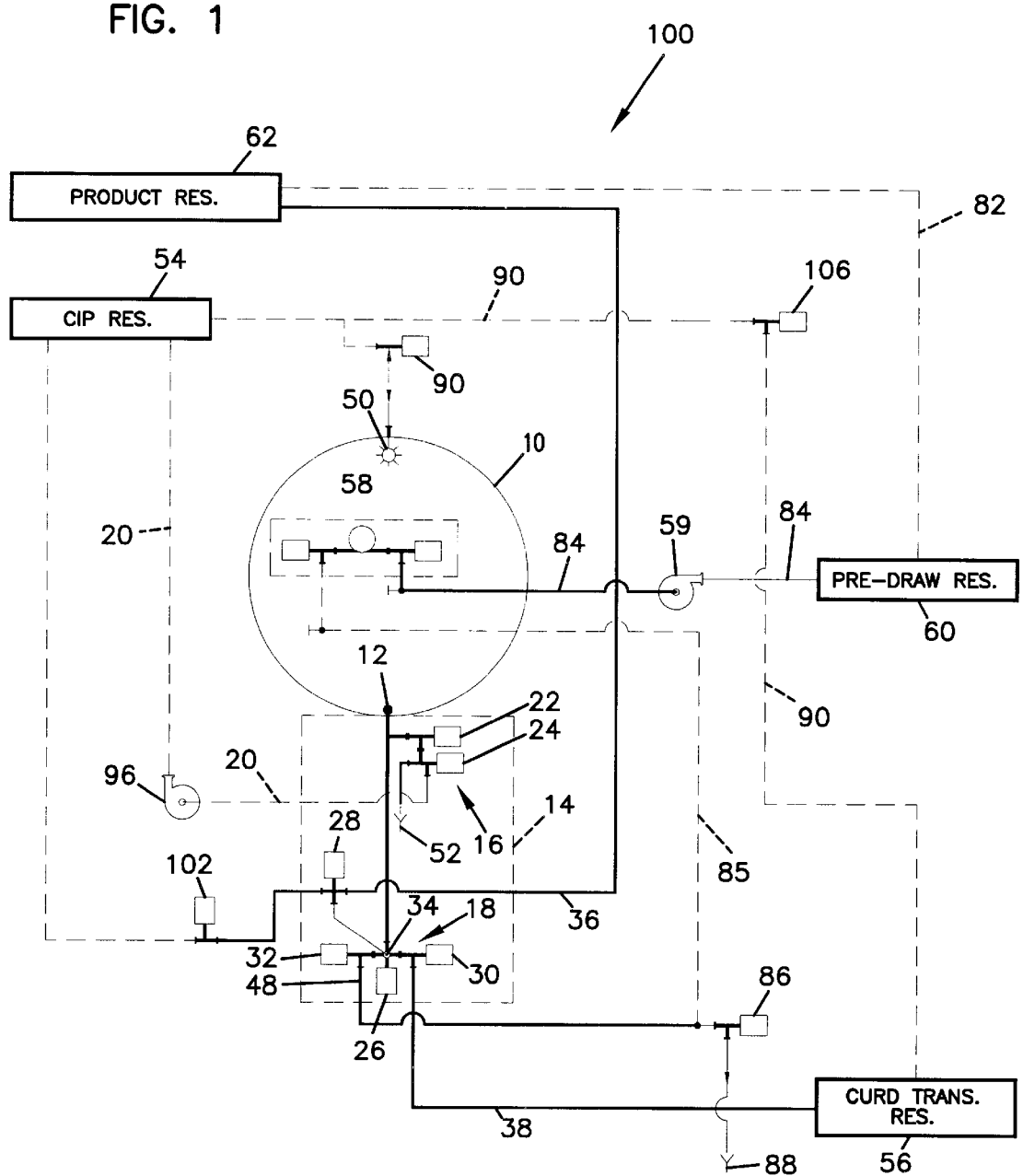
FIG. 1 is a schematic representation of a batch processing system incorporating a valve assembly according to the principles disclosed.

A preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

Although a system for processing cheese is described herein, the claimed invention can be used on many other embodiments of batch processing systems as well as systems for processing products and materials other than cheese. Furthermore, although the system is illustrated as a single vat system, it is understood that the claimed invention can be used on many different scales of systems, including systems that incorporate two or more vats and systems that essentially operate those vats simultaneously. Additionally, the system can be used to clean a variety of different vessels or containers for holding a product other than a vat. Accordingly, terms such as vat, reservoir, tank, container, vessel, and the like are used interchangeably to mean any type of structure that can hold a fluid or semi fluid material.

As will become apparent below, the system described herein has three stages of operation. One operating stage is a batch processing stage during which ingredients are loaded into a vat, processed, and unloaded from the vat. A second operating stage is a clean-in-place stage for cleaning the vat (vat CIP) between batch processing cycles. A third operating stage is a clean-in-place stage for cleaning the lines (e.g., pipes, hoses, headers, valves, and related components) during an end-of-the-day (line CIP). Although certain cleaning procedures are discussed, it is to be understood that the valve assemblies disclosed herein can be used with any type of processing or operation for cleaning the system.

A cleaning fluid can be any type of cleaning agent, sanitizing agent, or combination of cleaning and sanitizing agent. In one possible embodiment, the fluid is a solution. Furthermore, cleaning involves cleaning and/or sanitizing the system and components discussed herein.

FIG. 1 illustrates one possible embodiment of a system, generally shown as 100, for processing a product such as cheese. For purposes of explanation, a simplified embodiment of the system 100 is illustrated and discussed herein. It is to be understood that many other components, including pumps, valves, drains, headers or lines, vats, tanks, reservoirs, processing equipment, cleaning equipment, and other components can be used within the system. In various embodiment that are possible, these components can be automatically or manually operated. Additionally, the illustrated fluid lines can be either a direct connection or piping.

The system 100 includes a vat 10, a product reservoir 62, a pre-draw reservoir 60, a curd transfer reservoir 56, a CIP reservoir 54, a valve assembly 14, and a pre-draw assembly 58. The vat 10 has a port 12 and may comprise any type of structure for holding a product such as a tank, reservoir, vessel, or food processing enclosure. The port 12 is located in the lower region of the vat 10. An advantage of locating the port 12 in the lower region of the vat 10 reduces or eliminates aeration and some of the resulting effects of aeration such as frothing or foaming when the tank is being filled. Additionally, each tank, vat, reservoir, or other vessel can include a bypass valve assembly that permits fluid flowing though lines to selectively bypass the tanks, vat, reservoir, or other vessels.

In one possible embodiment, the product reservoir 62 forms part of a cheese milk pasteurizing unit, the pre-draw reservoir 60 includes whey storage tanks, and the curd transfer reservoir 56 interfaces with equipment for transferring curds to finishing equipment. The CIP reservoir can include a single tank or a plurality of tanks. These tanks forming the CIP reservoir can include a several different types of cleaning fluids. For example, one tank in the CIP reservoir might include a cleaning solution or other type of cleaning agent and another tank in the CIP reservoir might include a sanitizing solution or other type of sanitizing agent.

Figure 2:
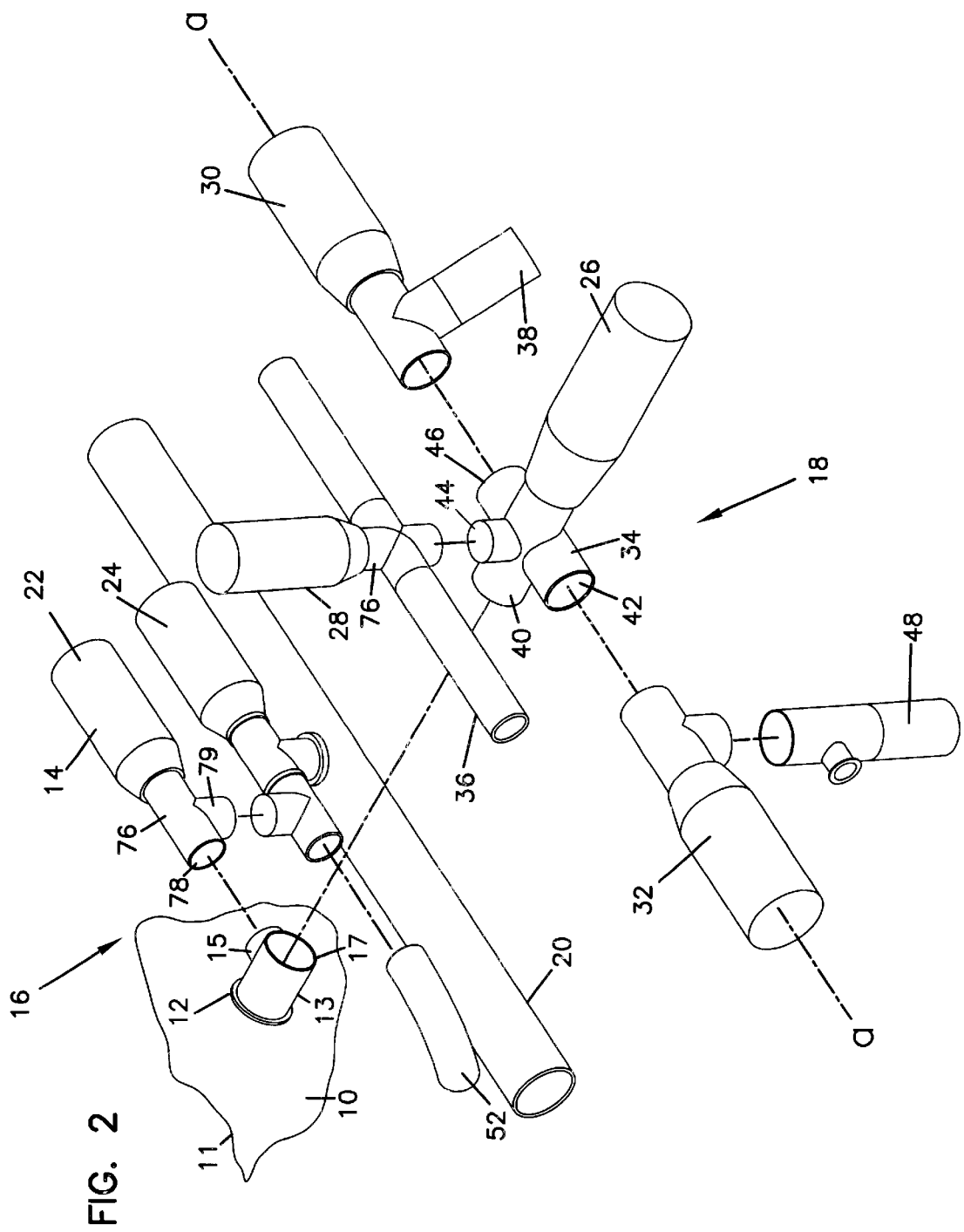
FIG. 2 is an exploded, front-left perspective view of one embodiment of a valve assembly according to the principles disclosed and schematically illustrated in FIG. 1.

Referring to FIGS. 1 and 2, the vat 10 has a wall 11. The port 12 is formed with a fitting 13 that extends from the wall 10 and has two fluid openings 15 and 17. The valve assembly 14 includes a CIP valve arrangement 16 and a product isolation valve arrangement 18. The CIP valve arrangement 16 is in fluid communication with the fluid opening 15 of the fitting 13, and includes a second CIP return line blocking valve 22 and a second CIP bleed valve 24. The second CIP return line blocking valve 22 controls fluid flow from the port 12 of the vat 10 to the second CIP bleed valve 24. As described in more detail below, the second CIP bleed valve 24 controls fluid flow between the second CIP return line blocking valve 22, a first drain 52, and a second CIP return line 20.

The product isolation valve arrangement 18 is in series with the CIP valve arrangement 16 and is in fluid communication with the fluid opening 17 of the fitting 13. The product isolation valve arrangement 18 includes a first product blocking valve 28, a second product blocking valve 30, a product isolation bleed valve 32, and a product isolation valve 26. The product isolation valve 26 includes a common junction 34, which has four ports. The first port 40 provides a fluid path between the common junction 34 and the port 12 of the vat 10. When the valve 26 is closed, it blocks the flow of fluid from the common junction 34 to the port 12. The second port 42, third port 44, and fourth port 46 provide a fluid path between the common junction 34 and the corresponding product isolation bleed valve 32, first product blocking valve 28, and second product blocking valve 30, respectively. Accordingly, the fluid path through the second port 42 is blocked when the product isolation bleed valve 32 is closed. The fluid path through the third port 44 is blocked when the first product blocking valve 28 is closed. The fluid path through the fourth port 46 is blocked when the second product blocking valve 30 is closed. The common junction 34 has a centerline a—a that passes through the third and fourth ports 42 and 46.

In the embodiment described herein, the first port 40 provide simultaneous fluid communication to the second port 42, the third port 44, and the fourth port 46. The first port 40 is in series with port 12 of the vat 10, and the ports of the second CIP return line blocking valve 22 and the second CIP bleed valve 24. Although the product isolation valve arrangement 18 illustrated and discussed herein includes only two product blocking valves 28 and 30, other embodiments might include more than two such valves. Additional product blocking valves also would be in fluid communication with the port 40 of the common junction 34 and on the same side of the port 40 as the first and second product blocking valves 28 and 30 so that closing the port 40 would block or isolate them from the port 12 of the vat 10.

In general, valves (such as the second CIP return line blocking valve 22) comprise an actuator portion 74, a valve body 76, a valve plug (not shown) positioned within the valve body 76, and a valve stem (not shown) couples the valve plug to the actuator portion 74. The valve body can have many different embodiment and shapes. For example, the valve body 76 of second CIP return line blocking valve 22 has an L-shape with two ports 78 and 79. In another example, first product blocking valve 28 has a T-shaped valve body.

Returning to the second CIP return line blocking valve 22, the valve plug is movable within the valve body 76 to open and close the fluid path between the two ports 78 and 79. For example, the fluid path is open between ports 78 and 79 of second CIP return line blocking valve 22 when the valve plug of second CIP return line blocking valve 22 is in an open position. The fluid path through the second CIP return line blocking valve 22 is closed or blocked between ports 78 and 79 of the second CIP return line blocking valve 22 when the valve plug of valve 22 is in a closed position and positioned between the port 78 and the port 79. Thus, when a valve is open, fluid or media is permitted to flow through the valve body 76; when the valve is closed, the fluid path is blocked and fluid is not permitted to flow through the valve body 76.

One type of valve that may be used for the valves disclosed herein is a Sanitary Remote-Controlled Valve, model number SRC-W-POL, which is manufactured by G&H Product Corp. Other embodiments might use valves from other manufactures as well as other types of valves and fluid control devices.

Figure 3:
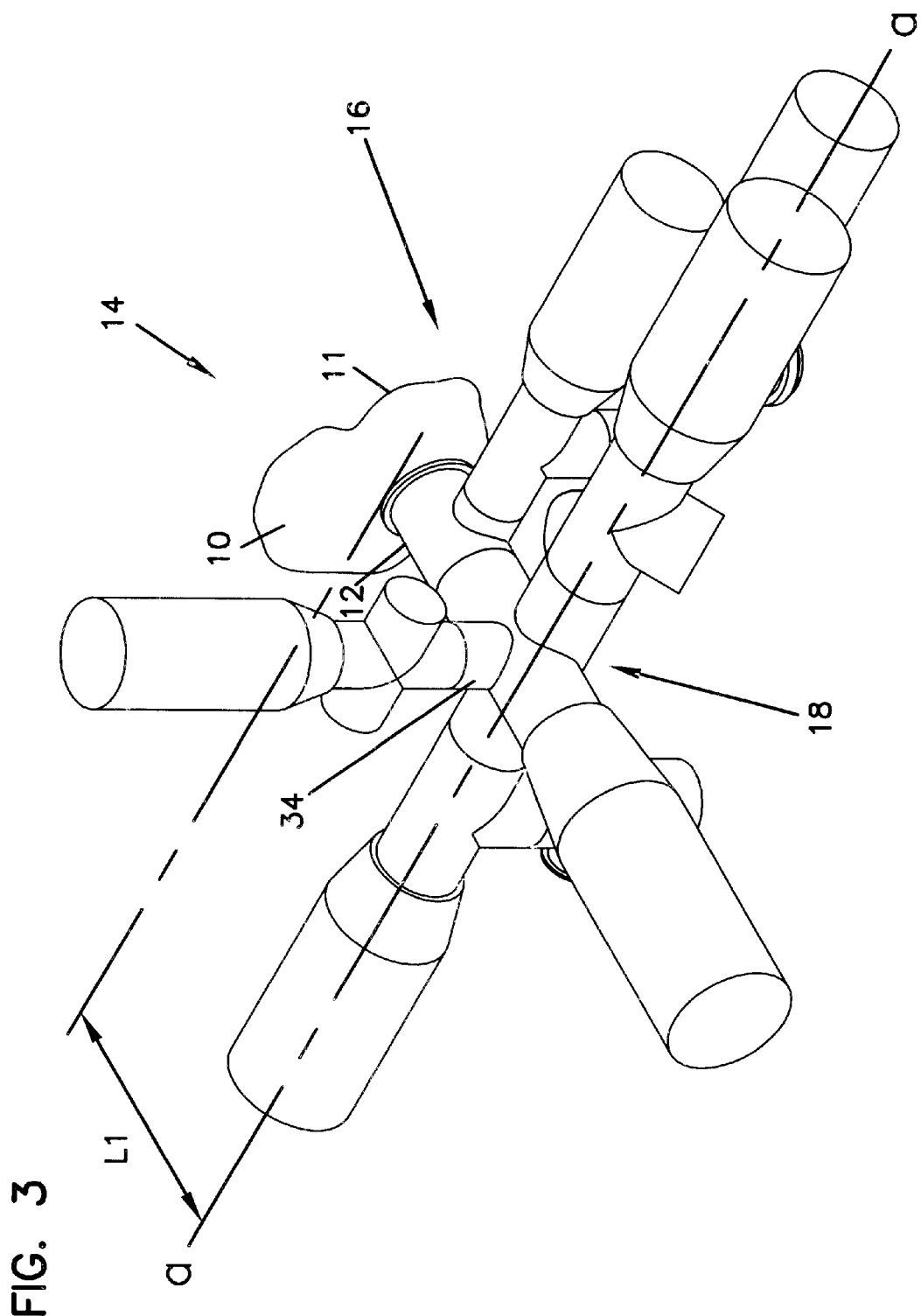
FIG. 3 is an assembled, front-right perspective view of the valve assembly illustrated in FIG. 2.

Referring to FIG. 3, the valve assembly 14 has a length L1 from the junction between the port 12 and the wall 11 of the vat 10 to the centerline a-a of the common junction 34 of the product isolation valve arrangement 18. In one possible embodiment, the length L1 is between about nine inches and about fifteen inches. In another possible embodiment, the length L1 of the valve assembly 14 is about twelve inches. Yet other embodiments might have different lengths for the length L1 in addition to those described herein.

Referring back to FIG. 1, a first CIP jumper line 82 provides a CIP fluid path between the bypass valve assembly of the product reservoir 62 and the bypass valve assembly of the pre-draw reservoir 60 for use during the line CIP stage. Fluid paths for carrying only cleaning fluid are illustrated as dashed lines. A pre-draw line 84 provides a fluid path between the pre-draw reservoir 60 and a pre-draw assembly 58. A pump 59 is inline with the pre-draw line 84. The pre-draw assembly 58 is positioned within or above the vat 10 and, during the processing of a product, removes a particular amount of fluid from the vat 10 prior to unloading the product from the vat 10. During the processing of cheese for example, the pre-draw assembly 58 draws whey from the vat 10. The pump 59 helps to draw fluid from the pre-draw assembly 58 to the pre-draw reservoir 60.

A second CIP jumper line 85, in combination with a bleed line 48, provides a CIP fluid path between the product isolation bleed valve 32 and the pre-draw assembly 58 during the line CIP stage. Additionally, a drain valve 86 controls fluid flow between the bleed line 48 and a second drain 88. The drain valve 86 is open and hence the bleed line 48 is open to the second drain 88 during the batch processing and CIP stages, as described above. The drain valve 86 is closed and hence the bleed line 48 is blocked from the second drain 88 during the line CIP stage.

A product input line 36 provides a fluid path from the product reservoir 62 to the first product blocking valve 28.

A CIP supply line 90 provides a fluid path between the CIP reservoir 54 and the curd transfer reservoir 56 during the line CIP stage. The CIP supply line 90 also provides a fluid path from the CIP Reservoir 54 to a CIP spray device 50 through a spray valve 92. Examples of a spray device 50 include a spray ball or spray disc. A CIP supply line valve 106 is inline with the CIP supply line 90, is positioned between the spray valve 92 and the curd transfer reservoir 56. The CIP supply line valve 106 controls the flow of fluid during the vat CIP stage and the line CIP stage.

The spray device 50 is positioned at the top of the vat 10 so that it will dispense fluid into the vat 10 and wet the wall 11 of the vat 10. In one possible embodiment, the spray device 50 is positioned high enough so that it will dispense fluid on the entire wall 11 of the vat 10. In another possible embodiment, the spray device 50 is positioned so that it will wet at least those portions of the wall 11 that are exposed to product.

A first CIP return line 94 provides fluid communication from the first product blocking valve 28 to the CIP reservoir 54 during the line CIP stage. A first CIP return line valve 102 controls fluid flow between the first product blocking valve 28 and the first CIP return line 94. During the line CIP stage, the first CIP return line valve 102 is open. During batch processing or vat CIP operations the first CIP return line valve 102 is closed. The second CIP return line 20 provides a fluid path from the second CIP bleed valve 24 to the CIP reservoir 54 during the vat CIP stage. A pump 96 is inline with the second CIP return line 20 and helps to drain fluid from the vat 10 to the CIP reservoir 54.

Figure 4:
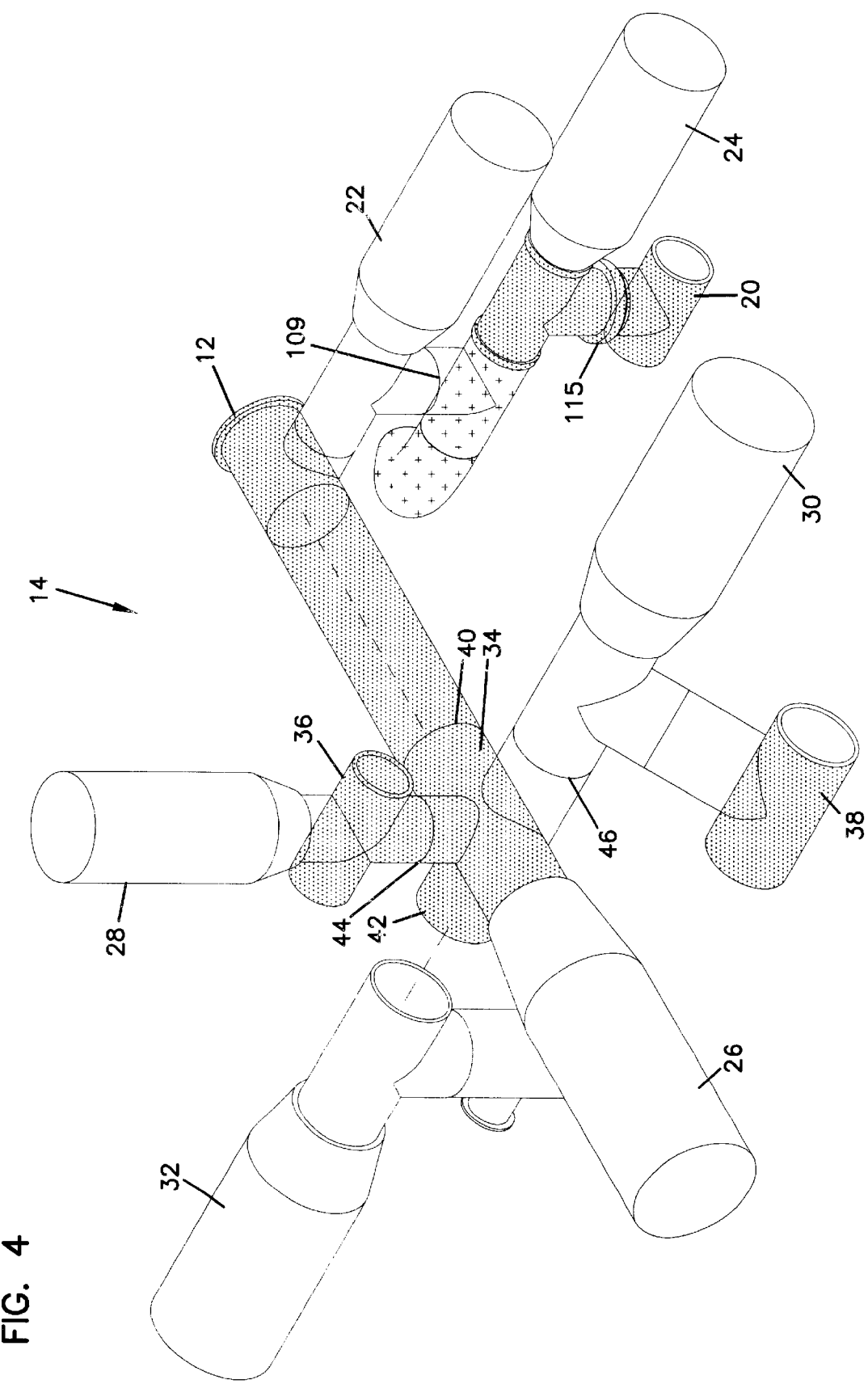
FIG. 4 is the valve assembly illustrated in FIG. 2 showing the flow process during vat filling.

Referring now to FIGS. 1 and 4, one phase of the batch processing stage is a loading phase in which ingredients are loaded or imported into the vat 10. The ingredients loaded into and processed in the vat 10 form a product. In the case of cheese processing, the product is a combination of whey and cheese curds.

During this loading phase, the first CIP return line valve 102, product isolating bleed valve 32, second product blocking valve 30, second CIP return line blocking valve 22, second CIP bleed valve 24, CIP supply line valve 106, and spray valve 92 are closed. Milk flows from the product reservoir 62, through the product input line 36, through the common junction 34, through the port 12, and into the vat 10. Once in the vat 10, the milk is processed to make cheese. In various embodiments, other ingredients and processing agents such as enzymes are added to the vat 10 though product headers or lines flowing into the vat 10 or otherwise.

When CIP supply line valve 106 and spray valve 92 are closed, they prevent cleaning fluid from flowing from the CIP reservoir 54 to the curd transfer reservoir 56 and vat 10, respectively. When the second CIP bleed valve 24 is closed, the valve plug is positioned between the ports 109 and 115 and blocks the fluid path through the CIP bleed valve 24. Accordingly, the second CIP bleed valve 24 blocks fluid flow from the second CIP return line 20. Additionally, the second CIP return line blocking valve 22 is closed. An advantage of this arrangement is that in the event that the second CIP bleed valve 24 fails to close, leaks, or otherwise fails, any cleaning fluid entering through the bleed valve 24 will be blocked from entering the vat 10 by the second CIP return line blocking valve 22 and potentially contaminating food product within the vat 10. The cleaning fluid will rather flow into the first drain 52. In an alternative embodiment, the cleaning fluid will drain to atmosphere (i.e., onto the floor). A related advantage of an embodiment in which the cleaning fluid drains to atmosphere rather than a drain is that fluid flowing to atmosphere provides visible leak detection if one of the valves 22 or 24 fails.

The shading in FIG. 4 (and FIG. 5 as discussed below) illustrates "live header" lines containing fluid flowing through the valve assembly 14, from the product reservoir 62 to the vat 10. The asterisks illustrate the region where CIP solution safely flows to prevent product contamination in the event that the second CIP bleed valve 24 is not closed, develops a leak, or otherwise fails.

Figure 5:
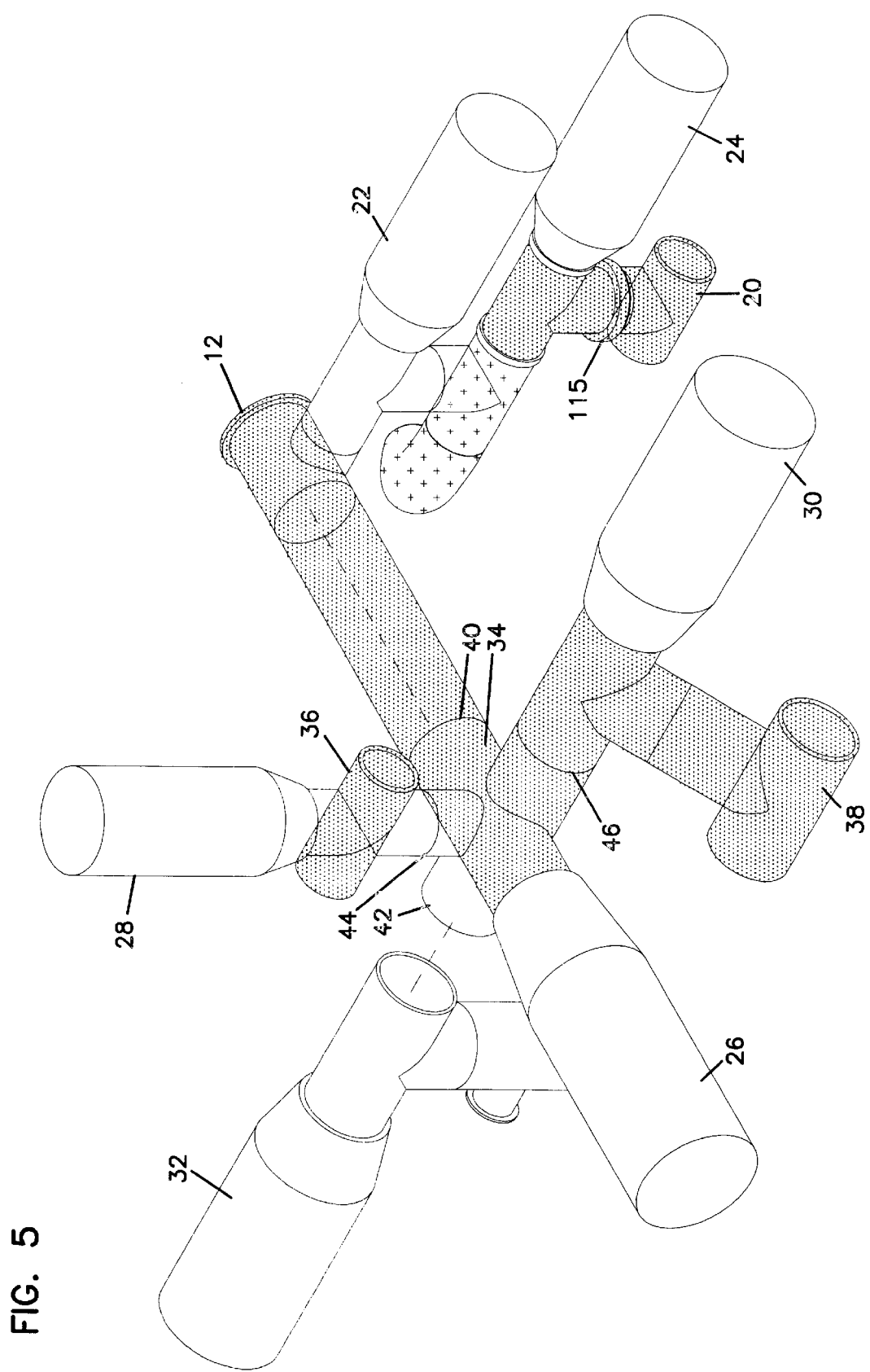
FIG. 5 is the valve assembly illustrated in FIG. 2 showing the flow process during vat unloading.

Referring now to FIGS. 1 and 5, another phase in the batch processing stage is an unloading stage. During the unloading phase, the first product blocking valve 28, the product isolation bleed valve 32, the second CIP return line blocking valve 22, the second CIP bleed valve 24, the spray valve 92, the CIP supply line valve 106, and the first CIP return line valve 102 are closed. In this state, the valve plug for the first product blocking valve 28 blocks the third port 44 of the common junction 34 and prevents product from flowing from the product input line 36 to the common junction 34. The product isolation blocking valve 26 and the second product blocking valve 30 are open. When the valve assembly 14 is in this state, product within the vat 10 (whey and curds if the system is processing cheese) drains through the port 12, through the common junction 34, through the product output line 38, and into the curd transfer reservoir 56. The product (e.g., whey and curds) then can be further processed.

Additionally, because the curds can have a cross-sectional area as large as three inch across, one possible embodiment of the system 100 has a cross-sectional area for the fluid path through the port 12, through the common junction 34, through the product output line 38 that is about four inches in diameter or greater. In other embodiments, the cross-sectional area of the fluid path might be smaller or larger depending on the product that is processes in the system 100 and whether the product results in a solid or semi-solid component such as curds. For example, in another possible embodiment, the cross-sectional area of the fluid path is about six inches.

Figure 6:
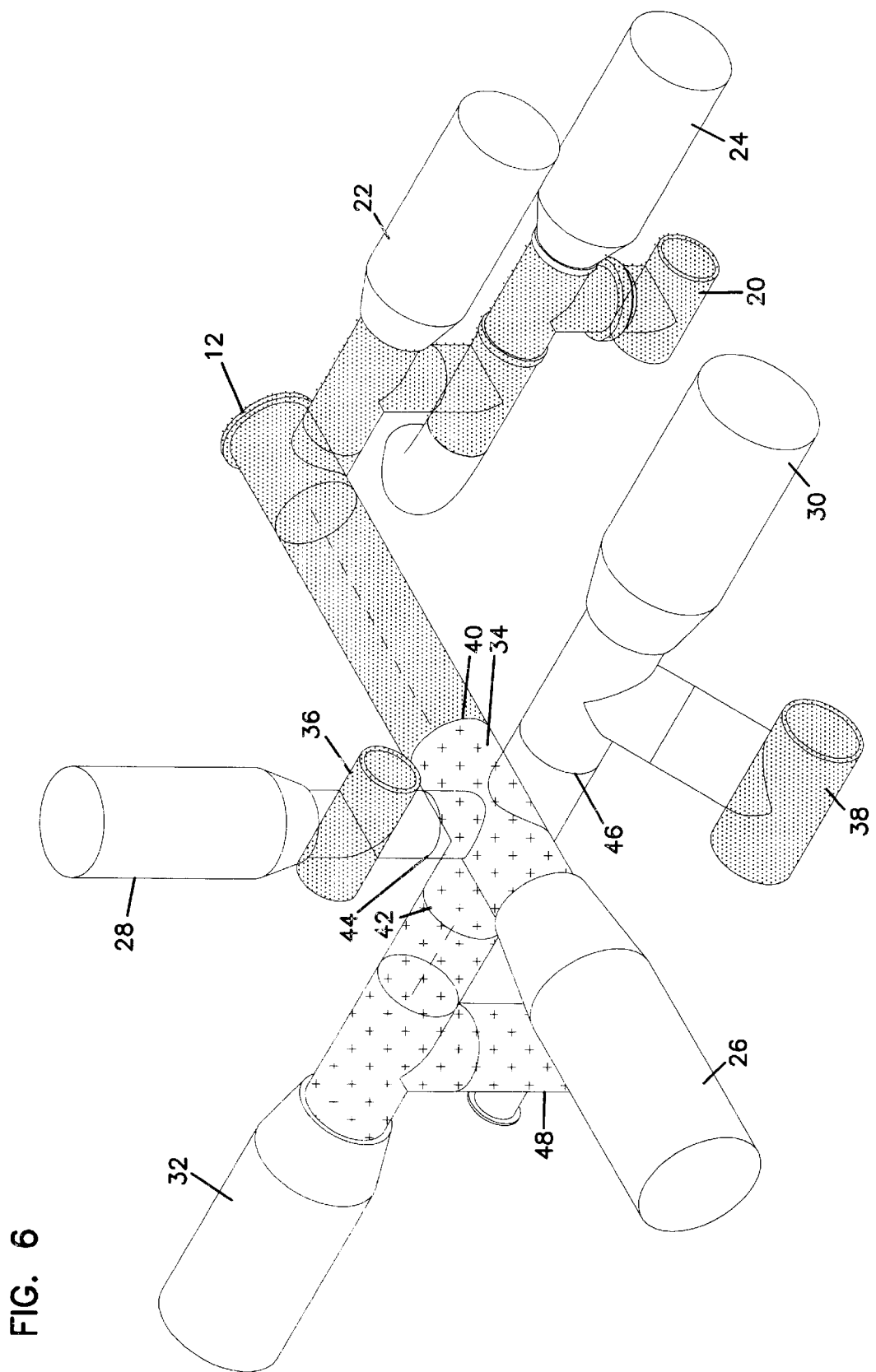
FIG. 6 is the valve assembly illustrated in FIG. 2 showing the flow process during a clean-in-place operation.

Referring to FIGS. 1 and 6, the vat CIP stage of processing involves cleaning a portion of the system that is exposed to product during the batch processing stage discussed with reference to FIGS. 4 and 5. Vat CIP cleaning is accomplished using a cleaning fluid stored in the CIP reservoir 54. During the vat CIP stage, the product isolation valve 26 is closed. When the product isolation valve 26 is closed, the valve plug blocks the third port 40 of the common junction 34. This position of the valve plug prevents fluid, such as the cleaning fluid, from flowing from the port 12 into the product input line 36 and the second product input line 38, thereby exposing product that is within those lines to the cleaning fluid. As an added layer of protection against fluid leaking into the product input line 36 or the second product input line 38, the first product blocking valve 28 and the second product blocking valve 30 are also closed.

The shading in FIG. 6 illustrates "live header" lines containing fluid flowing through the valve assembly 14, from the vat 10 to the second CIP solution line 20. The asterisks illustrate the region where cleaning fluid or CIP solution safely flows to prevent product contamination in the event that the product isolation blocking valve 26 is not closed, develops a leak, or otherwise fails.

In addition, during the vat CIP stage, the product isolation bleed valve 32, the second CIP return line blocking valve 22, the second CIP bleed valve 24, and the spray valve 92 are open. The first CIP return line blocking valve 102 and the CIP supply line valve 106 are closed. Given this state of the valves, cleaning fluid flows from the CIP reservoir 54, through the spray valve 92, through the spray device 50, and into the vat 10. The cleaning fluid then flows from the vat 10, through the port 12, through the second CIP return line blocking valve 22, through the second CIP bleed valve 24, through the second CIP return line 20, and back into the CIP reservoir 54.

Yet another layer of protection against contamination of the product input line 36 and the second product input line 38 is provided by the open product isolation bleed valve 32, which diverts any flow of cleaning fluid that may leak through the product isolation blocking valve 26 to the bleed line 48 and an open drain valve 86 coupled to the second drain 88. The cross-sectional area of the product isolation bleed valve 32 is about the same size as the cross-sectional areas of the port 12 and the first port 40 of the common junction 34 to ensure that the full flow of cleaning fluid may be accommodated and diverted or discharged to the bleed line 48. An alternative embodiment might divert leaking cleaning fluid from the product isolation bleed valve to atmosphere, which would provide a visual indication that there is a failed valve.

In the preferred embodiment, the blocking valves, such as the second CIP return line blocking valve 22, the product isolation blocking valve 26, and the first and second product blocking valves 28 and 30, are spring-to-close for failsafe purposes. The second CIP bleed valve 24 and the product isolation bleed valve 32 are spring-to-open for failsafe purposes. In another embodiment, sensors are incorporated into the valve configuration to monitor the position of valve plugs. Examples of sensors include location sensors and proximity sensors.

These valve arrangements have many advantages. For example, product may safely remain within the product input line 36 and the product output line 38 during the vat CIP stage, saving time and expense in batch processing procedures. Another example, is that a single product isolation bleed valve 32 isolates multiple product input valves (e.g., first product blocking valve 28 and the second product blocking valve 30) and hence multiple product lines (e.g., the product input line 36 and the product output line 38), which simplifies the design and operation of the system 100.

Returning to FIG. 1, the line CIP stage is used to comprehensively clean and sanitize those portions of the system 100 that are exposed to product. During the line CIP stage, the second product blocking valve 30, the product isolation bleed valve 32, the first CIP return line valve 102, and the CIP supply line valve 106 are open. In addition, the product isolation valve 26, the first product blocking valve 28, the spray valve 92, and the drain valve 86 are closed.

Cleaning fluid flows from the CIP reservoir 54, through the CIP supply line 90, and through bypass valve assembly of the curd transfer reservoir 56 to the product output line 38. The cleaning fluid then flows backwards through the product output line 38, through the second product valve 30, through the common junction 34, through the isolation bleed valve 32, and into the bleed line 48.

The cleaning fluid then flows through the bleed line 48, through the second CIP jumper 85, and into the pre-draw valve assembly 58. The cleaning fluid cleanses the pre-draw assembly 58, flows through the pre-draw line 84, including through the pre-draw pump 59, and into bypass valve assembly of the pre-draw reservoir 60. From the bypass valve assembly of the pre-draw reservoir 60, the cleaning fluid flows through the first CIP jumper line 82, into the bypass valve assembly of the product reservoir 62, through the product input line 36, through the first product blocking valve 28, through the first CIP return line 94, and returned to the CIP reservoir 54.

Using the bypass valve assemblies in this manner prevents the product reservoir 62, pre-draw reservoir 60, and curd transfer reservoir 56 from filling with cleaning fluid during the line CIP stage. These reservoirs 62, 60, and 56 are cleaned using other procedures. Other embodiments may load cleaning fluid into these reservoirs 62, 60, and 56 during the line CIP stage.

The embodiment of system 100 has several advantages. For example, the product isolation valve 26, first product blocking valve 28, and second product blocking valve 30 have an internal valve face including the inner surface of the ports and the valve plug (not shown) that contacts food products during batch processing operation. In the line CIP stage, the cleaning fluid flowing through the product isolation valve arrangement 18 sweeps across and cleans the inner surfaces of the product isolation valve 26, first product blocking valve 28, and second product blocking valve 30. Another advantage is that system components not exposed to product are not cleaned during the line CIP stage, which saves time and cleaning fluid. Examples of components that are not cleaned during the line CIP stage include the second CIP return line blocking valve 22, the second CIP bleed valve 24, and the second CIP return line 20. These components are periodically exposed to cleaning fluid during the CIP stage of process described earlier with reference to FIG. 6, which is performed between batch processing cycles. Yet another advantage is that all areas of piping, valving, or equipment exposed to product is within the continuous flow of the cleaning fluid during the line CIP stage. As a result, no portions of the system 100 require manual cleaning with a cleaning fluid.

During the line CIP stage, the second product blocking valve 30 and the product isolation bleed valve 32 are closed for a short period of time so that the cleaning fluid will clean and/or sanitize the valve stems. Similarly, the product isolation valve 26 and the first product blocking valve 28 are opened sequentially or alternately for a short period of time so that the cleaning fluid will clean and/or sanitize the valve seats. Second product blocking valve 30 is open while the product isolation valve 26 and the first product blocking valve 28 are opened.

Figure 7:
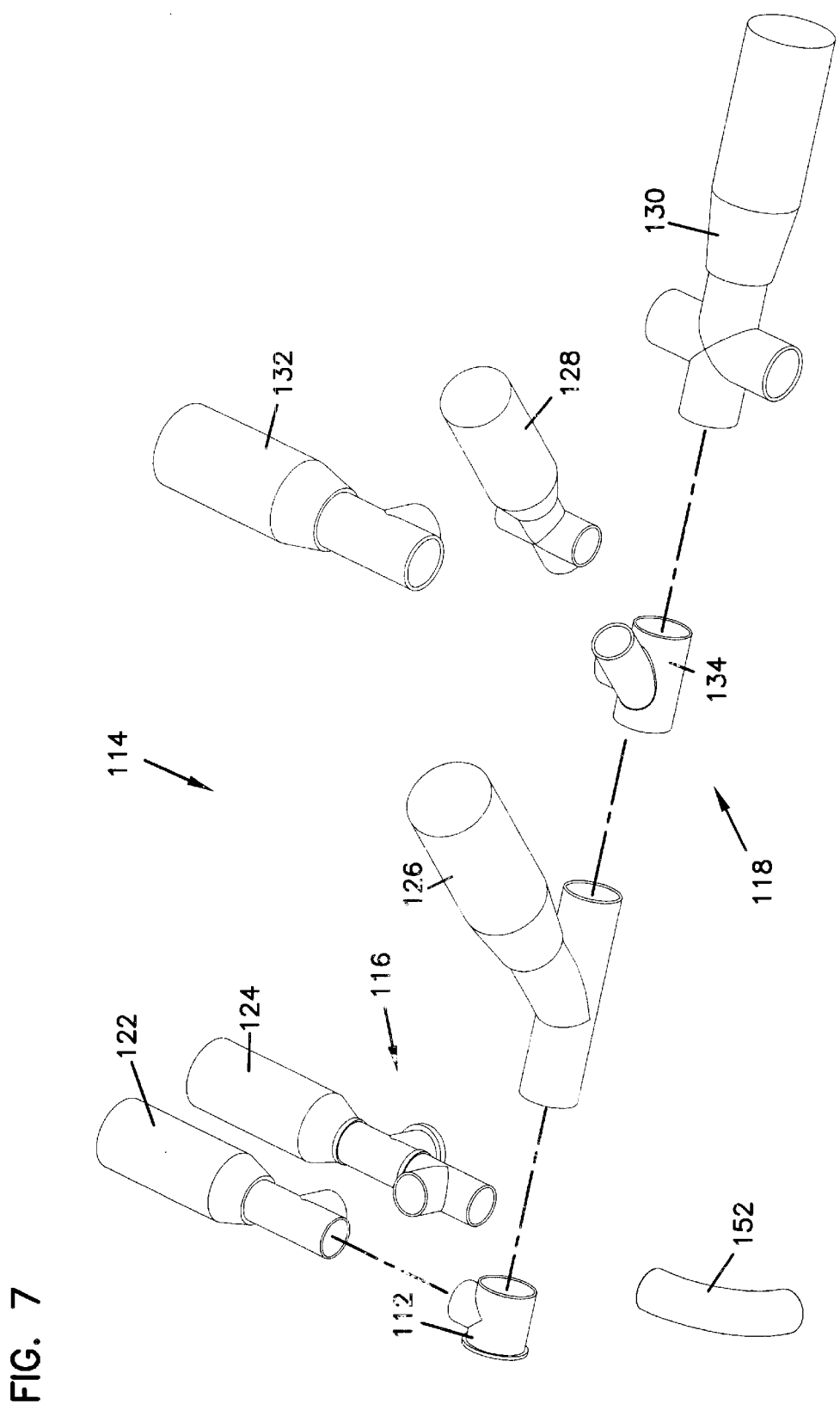
FIG. 7 is an alternative embodiment of the valve assembly illustrated in FIG. 2.

Referring to FIG. 7, an alternative embodiment to the valve assembly 14 is generally illustrated as 114. Similar to the valve assembly 14, the valve assembly 114 includes a port 112 for a vat and a CIP valve arrangement 116, which has a first blocking valve 122, a second CIP return line blocking valve 124, and a second drain 152.

A product isolation valve arrangement 118 is in series with the CIP valve assembly 116. The product isolation valve arrangement 118 operates similar to the product isolation valve arrangement 18 and includes a product isolation blocking valve 126, one isolation bleed valve 132, a first product blocking valve 128, and a second product blocking valve 130. The product isolation blocking valve 126 of the isolation arrangement 118 includes a common junction 134 that provides a fluid path between a the first product blocking valve 128, the a second product blocking valve 130, and the product isolation bleed valve 132. In this embodiment, the product isolation valve 126 is positioned between the port 112 and the common junction 134.

In addition to the embodiments illustrated and described herein, many other embodiment of the valve assembly 14, including the CIP valve arrangement 16 and the product isolation valve arrangement 18, are possible.

Although the description of the structures and methods has been quite specific, it is contemplated that various modifications could be made without deviating from the spirit of the present invention. Accordingly, it is intended that the scope of the present invention be dictated by the appended claims, rather than by the description of the preferred embodiment and method.

The claimed invention is:

1. A food processing system, comprising:
   (a) a vat for containing a mixture of food product;
   (b) a port located at a bottom region of said vat; and
   (c) a valve assembly in fluid communication with said port, the valve assembly including:
      (i) a first failsafe valve arrangement; and
      (ii) a second failsafe valve arrangement, said second failsafe valve arrangement having:
         1. one isolating valve;
         2. at least two product valves, including a first product valve and a second product valve; and
         3. one bleed valve.

2. The food processing system according to claim 1, wherein said isolating valve includes a connecting member to which the first and second product valves and the bleed valve are in fluid communication.

3. The food processing system according to claim 1, wherein said second failsafe valve arrangement further comprises a fluid communication junction, said fluid communication junction including:
   (a) an isolation blocking port;
   (b) at least a first product blocking port and a second product blocking port; and
   (d) a bleed valve port.

4. The food processing system according to claim 1, wherein:
   (a) said isolation valve is a normally closed valve;
   (b) said first and second product valves are normally closed valves; and
   (c) said bleed valve is a normally open valve.

5. The food processing system according to claim 4, wherein said isolating valve, said first and second product valves, and said bleed valve further include a sensor to verify valve position during operation.

6. A cheese processing system, comprising:
   (a) a vat having an upper portion and a lower portion;
   (b) a vat port located in the lower portion of said vat for providing bottom filling of said vat;
   (c) an output line for transport of a cleaning fluid;
   (d) a first food product line for transport of a fluid milk product;
   (e) a second food product line for transport of a mixture of fluid milk product and cheese curds;
   (f) a valve assembly;
      (i) said valve assembly providing fluid communication between:
         (1) said vat and said first output line;
         (2) said first food product line and said vat;
         (3) said vat and said second food product line;
      (ii) said valve assembly including:
         (1) a clean-in-place valve arrangement, said clean-in-place valve arrangement including:
            (A) a first blocking valve in fluid communication with said vat port and the first output line; and
            (B) a clean-in-place bleed valve in fluid communication with said first blocking valve;
         (2) a product isolation valve arrangement, said product isolation valve arrangement including:
            (A) a second blocking valve in fluid communication with said vat port, said second blocking valve sized to accommodate transportation of the mixture of fluid milk product and cheese curds;
            (B) a third blocking valve in fluid communication with said second blocking valve and the first food product line;
            (C) a fourth blocking valve in fluid communication the said second blocking valve and the second food product line, said fourth blocking valve sized to accommodate transportation of the mixture of fluid milk product and cheese curds;
            (D) a product isolation bleed valve in fluid communication with said second blocking valve; and
      (iii) said valve assembly selectively operating to isolate first and second food products lines during clean-in-place operations.

* * * * *